US011492098B2

United States Patent
Toyoda et al.

(10) Patent No.: US 11,492,098 B2
(45) Date of Patent: Nov. 8, 2022

(54) HIGH-LIFT DEVICE, WING, AND AIRCRAFT

(71) Applicant: MITSUBISHI HEAVY INDUSTRIES, LTD., Tokyo (JP)

(72) Inventors: Kosuke Toyoda, Tokyo (JP); Hikaru Takami, Tokyo (JP); Hiroki Sakiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 301 days.

(21) Appl. No.: 16/769,328

(22) PCT Filed: Feb. 22, 2019

(86) PCT No.: PCT/JP2019/006870
§ 371 (c)(1),
(2) Date: Jun. 3, 2020

(87) PCT Pub. No.: WO2019/167846
PCT Pub. Date: Sep. 6, 2019

(65) Prior Publication Data
US 2021/0114718 A1   Apr. 22, 2021

(30) Foreign Application Priority Data

Mar. 2, 2018   (JP) .............................. JP2018-037462

(51) Int. Cl.
*B64C 13/30*   (2006.01)
*B64C 9/02*    (2006.01)
*B64C 9/24*    (2006.01)

(52) U.S. Cl.
CPC ................ *B64C 13/30* (2013.01); *B64C 9/02* (2013.01); *B64C 9/24* (2013.01)

(58) Field of Classification Search
CPC .. B64C 13/30; B64C 9/02; B64C 9/24; B64C 9/06
See application file for complete search history.

(56) References Cited

U.S. PATENT DOCUMENTS 3,743,219 A * 7/1973 Gorges ...................... B64C 9/24
                                                          244/210
5,158,252 A   10/1992 Sakurai
(Continued)

FOREIGN PATENT DOCUMENTS

JP    H07-132891 A   5/1995
WO    2009/118547 A2  10/2009

OTHER PUBLICATIONS

PCTISA/210, "International Search Report for International Application No. PCT/JP2019/006870," Apr. 9, 2019.
(Continued)

*Primary Examiner* — Rodney A Bonnette
(74) *Attorney, Agent, or Firm* — Manabu Kanesaka; Benjamin Hauptman; Kenneth Berner

(57) ABSTRACT

A high-lift device includes a flap disposed at a leading edge of a wing, and configured to be retracted in the lower surface and extended toward of the leading edge; a first rotary shaft and a second rotary shaft, the axial direction of the rotary shafts being disposed along the spanwise direction of the wing, respectively; a first link mechanism connected to the first rotary shaft and the flap; and a second link mechanism connected to the second rotary shaft and the flap. When the first link mechanism is driven with the first rotary shaft, the flap is retracted in the lower surface of the leading edge or is extended toward the front of the leading edge. When the second link mechanism is driven with the second rotary shaft, the position or the angle of the flap moved by the first link mechanism is changed.

5 Claims, 5 Drawing Sheets

(56) References Cited

U.S. PATENT DOCUMENTS

| | | | |
|---|---|---|---|
| 5,474,265 A | 12/1995 | Capbern et al. | |
| 9,656,739 B2 | 5/2017 | Hue et al. | |
| 9,896,190 B1* | 2/2018 | Amorosi | B64C 3/14 |
| 2006/0000952 A1* | 1/2006 | Rampton | B64C 9/22 |
| | | | 244/214 |
| 2011/0036944 A1 | 2/2011 | Mann | |
| 2013/0206917 A1 | 8/2013 | Sakurai et al. | |
| 2014/0312175 A1* | 10/2014 | Sakurai | B64C 9/02 |
| | | | 244/99.2 |

OTHER PUBLICATIONS

PCT/ISA/237, "Written Opinion of the International Searching Authority for International Application No. PCT/JP2019/006870," Apr. 9, 2019.

* cited by examiner

US 11,492,098 B2

HIGH-LIFT DEVICE, WING, AND AIRCRAFT

RELATED APPLICATIONS

The present application is National Phase of International Application No. PCT/JP2019/006870 filed Feb. 22, 2019, and claims priority from Japanese Application No. 2018-037462, filed Mar. 2, 2018, the disclosure of which is hereby incorporated by reference herein in its entirety.

TECHNICAL FIELD

The present invention relates to a high-lift device, a wing, and an aircraft.

BACKGROUND ART

In a wing of an airplane (aircraft), a high-lift device is installed in a leading edge and a trailing edge of the wing in order to reduce a speed during takeoff and landing without reducing a speed during a cruising flight. A Krueger flap in the high-lift device used for the leading edge of the wing is retracted in a lower surface of the leading edge of the wing, and is extended forward when deployed.

In addition, when extended, by forming a gap (slot) between the trailing edge of the flap and the leading edge of the wing, there are cases where a high-energy airflow flowing through the gap is blown to an upper surface of the wing.

PTL 1 below discloses a technique as follows. In order to prevent a possibility that the flap may be deformed by the airflow and a gap dimension may be changed between the flap and the wing, the flap is pulled by a holding member to limit a gap interval.

CITATION LIST

Patent Literature

[PTL 1] U.S. Pat. No. 9,656,739
[PTL 2] U.S. Pat. No. 5,158,252

SUMMARY OF INVENTION

Technical Problem

The Krueger flap is configured to be retracted or extended by a rotary actuator and a link mechanism. As disclosed in PTL 2 above, in the related art, the link mechanism is driven by a single rotary actuator. Accordingly, a position or an angle of the flap is determined by the link mechanism.

Incidentally, when an airplane takes off and lands, an optimal aerodynamic shape of the wing or an optimal gap dimension of the slot varies. However, as described above, in a case where the link mechanism is driven by the single rotary actuator, the flap can be driven only at a predetermined position or at a predetermined angle. Therefore, although the position and the angle of the flap can be changed in accordance with conditions at the time of the takeoff or landing, the optimal shape and the optimal gap dimension cannot be set both at the time of takeoff and at the time of landing.

PTL 1 discloses a technique as follows. On the flap, an inclination angle is changed while a position of the leading edge is maintained to be constant, and the gap dimension is adjusted to a predetermined distance.

However, although PTL 1 discloses changing the angle of the flap, PTL 1 does not disclose changing the position of the flap.

The present invention is made in view of the above-described circumstances, and an object thereof is to provide a high-lift device, a wing, and an aircraft, which can more properly set a position and an angle of a flap in accordance with a flight state of an aircraft.

Solution to Problem

In order to solve the above-described problems, the high-lift device, the wing, and the aircraft according to the present invention adopt the following means.

That is, a high-lift device according to the present invention is provided with a flap which is installed in a leading edge of a wing, retracted in a lower surface of the leading edge, and extended forward of the leading edge, a first rotary shaft having an axial direction installed along a spanwise direction of the wing, a second rotary shaft having an axial direction installed along the spanwise direction of the wing, a first link mechanism connected to the first rotary shaft and the flap, and a second link mechanism connected to the second rotary shaft and the flap. The first link mechanism is driven by a rotation force of the first rotary shaft so that the flap is retracted in the lower surface of the leading edge or is extended forward of the leading edge. The second link mechanism is driven by a rotation force of the second rotary shaft so that a position or an angle of the flap moved by the first link mechanism is changed.

According to this configuration, the first link mechanism is driven by the rotation force of the first rotary shaft so that the flap is retracted in the lower surface of the leading edge or is extended forward of the leading edge. In addition, the second link mechanism is driven by the rotation force of the second rotary shaft so that the position or angle of the flap moved by the first link mechanism is changed. Therefore, unlike a case where the position or the angle of the flap is adjusted only by the first link mechanism connected to the first rotary shaft, the flap can be set to more various positions or angles.

According to the present invention, the high-lift device may further include a rotary member having an axial direction installed along the spanwise direction of the wing, a first link member having one end connected to the first rotary shaft via a first joint, and the other end connected to the flap via a second joint, a second link member having one end connected to the first rotary shaft via the first joint, and the other end connected to the flap via a third joint, a third link member having one end connected to the rotary member via a fourth joint, and the other end connected to the flap via a fifth joint, a fourth link member having one end connected to the second rotary shaft via a sixth joint, and the other end connected to the rotary member via a seventh joint, and a fifth link member having one end connected to the second rotary shaft via an eighth joint, and the other end connected to the rotary member via a ninth joint. The first link mechanism may be composed of the first link member, the second link member, and the third link member. The second link mechanism may be composed of the rotary member, the first link member, the second link member, the third link member, the fourth link member, and the fifth link member.

According to this configuration, by the rotation of the first rotary shaft, while the first joint moves around the axis of the first rotary shaft, the first link member and the second link member which are connected by the first joint pivot around the first joint as a fulcrum, and the flap moves. In addition, by the rotation of the first rotary shaft, the third link member connected by the fourth joint of the rotary member and the fifth joint of the flap pivot around the fourth joint as a fulcrum. As a result, positions of the first joint of the first rotary shaft, the second joint, the third joint, and the fifth joint of the flap are changed, and the flap is changed from a retracted position to an extended position. In a case where the first rotary shaft is rotated in an opposite direction in a state where the flap is extended, the flap is changed from the extended position to the retracted position.

In addition, by the rotation of the second rotary shaft, the sixth joint and the eighth joint move around an axis of the second rotary shaft. Then, the fourth link member connected by the sixth joint and the fifth link member connected by the eighth joint move, and the rotary member rotates around the axis in accordance with a movement of the second rotary shaft. In addition, by the rotation of the rotary member around the axis, a position of the fourth joint of the rotary member moves. In this manner, the third link member connected by the fourth joint of the rotary member moves. Furthermore, by the rotation of the rotary member, the first link member and the second link member pivot around the first joint as a fulcrum, and the position or the angle of the flap is changed while the flap is maintained in an extended state.

The wing according to the present invention is provided with the high-lift device described above.

In addition, the aircraft according to the present invention is provided with the high-lift device described above.

Advantageous Effects of Invention

According to the present invention, a position and an angle of a flap can be more properly set in accordance with a flight state of an aircraft, a shape of a wing optimal for the flight state can be set, and a gap between a trailing edge of the flap and a leading edge of the wing can be set to a dimension optimal for the flight state.

DESCRIPTION OF EMBODIMENTS

Figure 1:
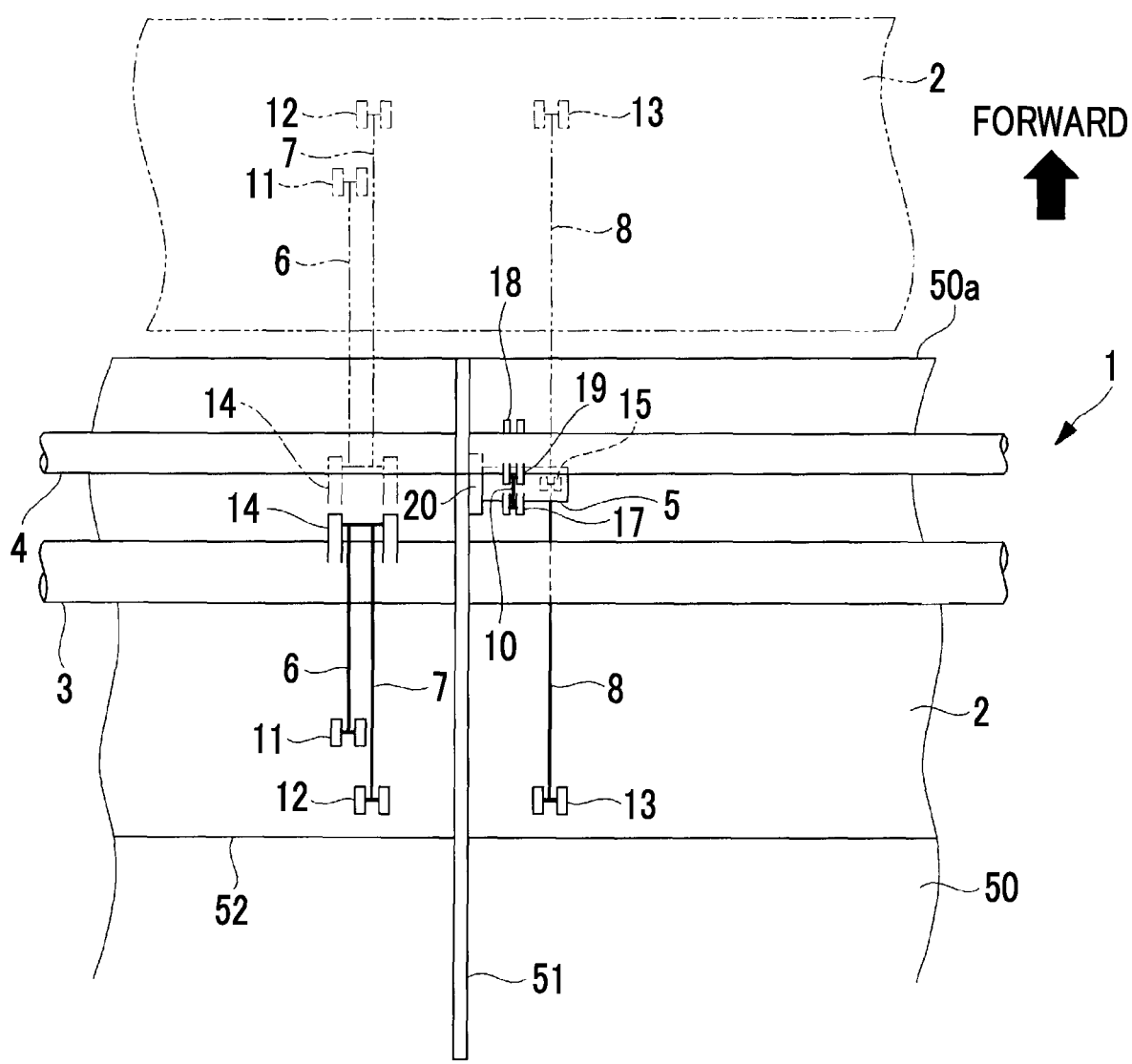
FIG. 1 is a plan view illustrating a high-lift device according to an embodiment of the present invention.
Figure 2:
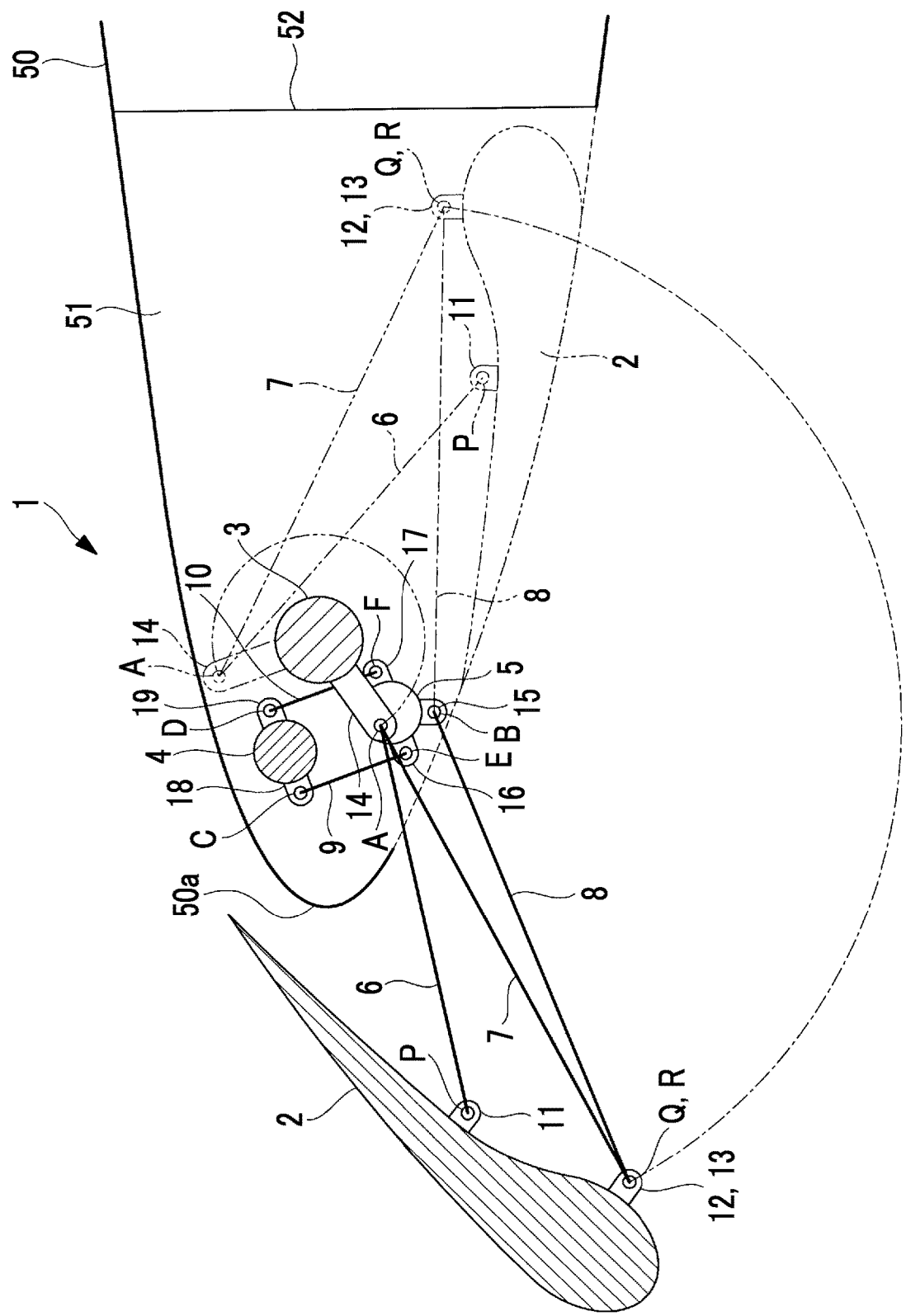
FIG. 2 is a longitudinal sectional view illustrating the high-lift device according to the embodiment of the present invention.
Figure 3:
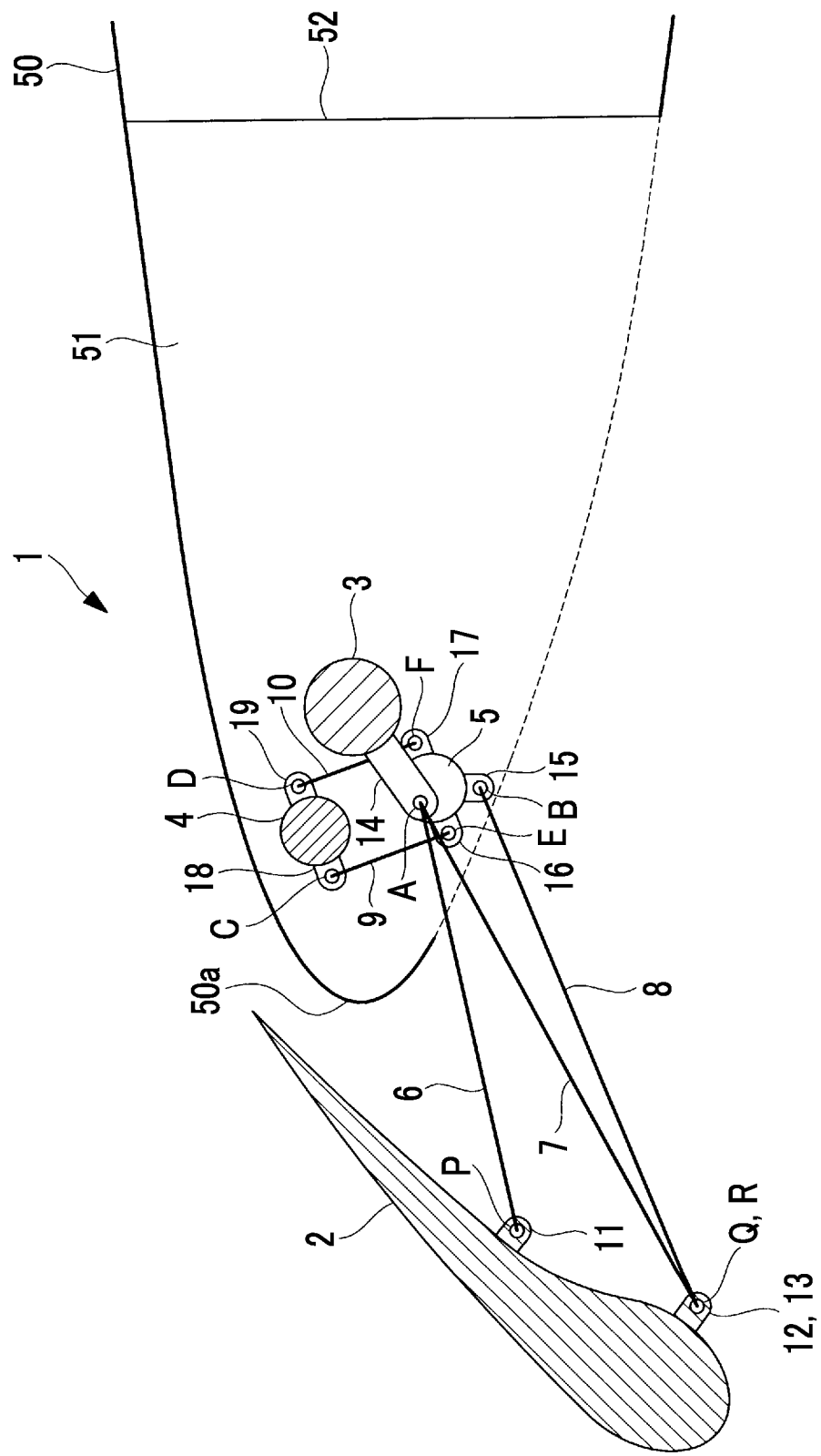
FIG. 3 is a longitudinal sectional view illustrating the high-lift device according to the embodiment of the present invention.
Figure 4:
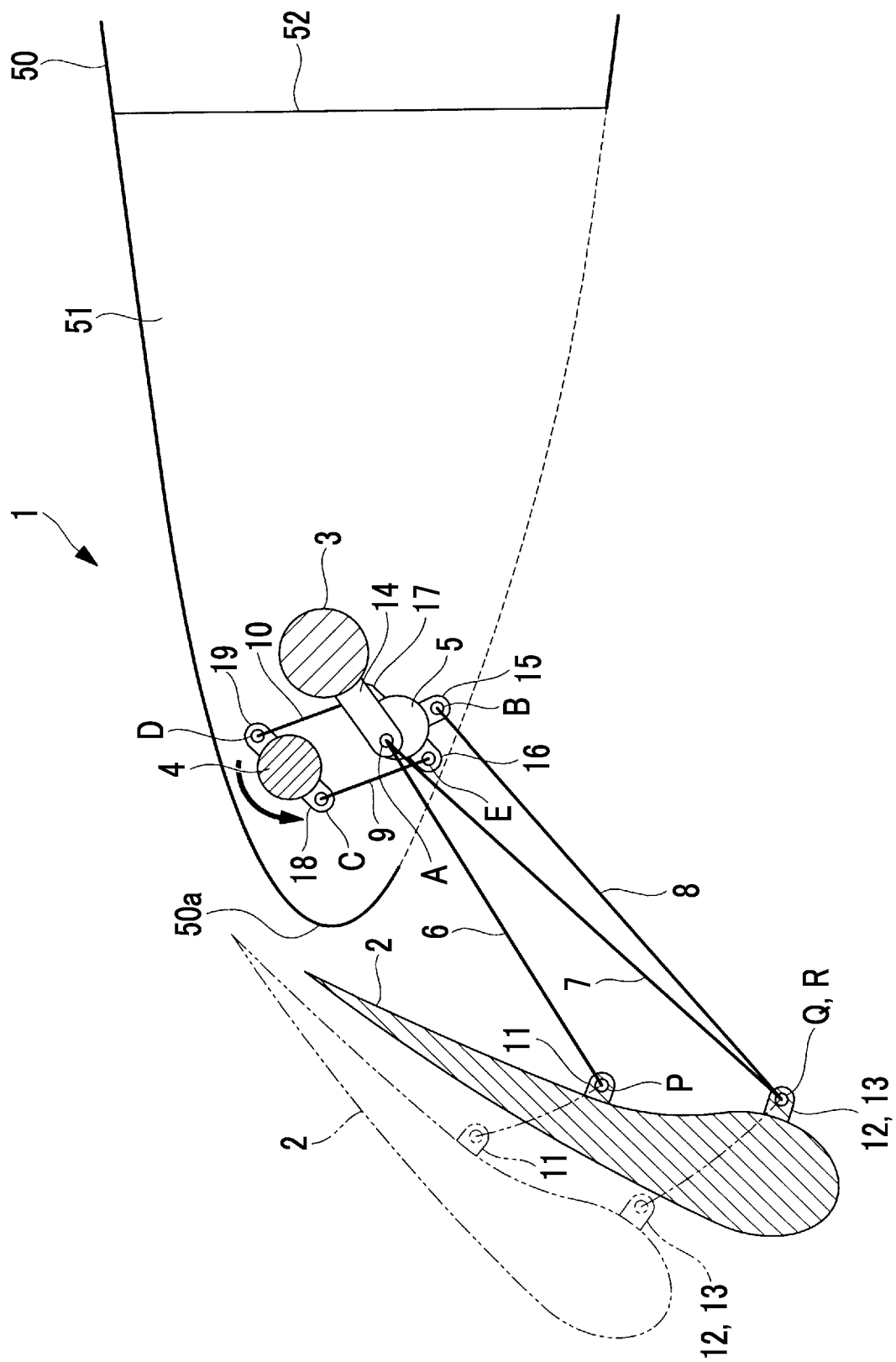
FIG. 4 is a longitudinal sectional view illustrating the high-lift device according to the embodiment of the present invention.

Hereinafter, a high-lift device 1 according to an embodiment of the present invention will be described with reference to the drawings. FIG. 1 is a plan view illustrating the high-lift device 1 according to the present embodiment, and is a view when a wing 50 is viewed from above in a state where a skin on an upper surface of the wing 50 is removed. FIG. 2 is a longitudinal sectional view illustrating the high-lift device 1 according to the present embodiment, a state where a flap 2 is retracted is illustrated using a broken line, and a state where the flap 2 is extended is illustrated using a solid line. FIG. 3 is a longitudinal sectional view illustrating the high-lift device 1 according to the present embodiment, and illustrates the state where the flap 2 is extended. FIG. 4 is a longitudinal sectional view illustrating the high-lift device 1 according to the present embodiment, a state where the flap 2 is extended is illustrated using a broken line, and a state where a position and an angle of the flap 2 are changed in the state where the flap 2 is extended is illustrated using a solid line.

As illustrated in FIGS. 1 to 4, the high-lift device 1 according to the embodiment of the present invention is provided with the flap 2 disposed in a leading edge 50a of a wing 50 of an airplane (aircraft). As illustrated by a broken line in FIG. 2, a solid line in FIG. 2, and a solid line and a broken line in FIGS. 3 and 4, the flap 2 is extended forward during takeoff or landing. In this manner, a lift coefficient can be improved. During a cruising flight of an airplane, as illustrated by the broken line in FIG. 2, the flap 2 is retracted in a lower surface of the leading edge 50a of the wing 50. The flap 2 according to the present embodiment is moved on a track between when the flap 2 is retracted and when the flap 2 is extended to the maximum by a first rotary shaft 3 and a first link mechanism. Moreover, a position and an angle of the flap 2 moved by the first link mechanism can be changed by a second rotary shaft 4 and a second link mechanism.

The high-lift device 1 is composed of a flap 2, a first rotary shaft 3, a second rotary shaft 4, a rotary member 5, a first link (node) member 6, a second link member 7, and a third link member 8, a fourth link member 9, and a fifth link member 10, etc. The first link mechanism is composed of the first link member 6, the second link member 7, and the third link member 8, and the second link mechanism is composed of the rotary member 5, the first link member 6, the second link member 7, the third link member 8, the fourth link member 9, and the fifth link member 10.

The flap 2 is a member having a wing shape and elongated in one direction, and is installed along a wing spanwise direction of the wing 50 at the leading edge 50a of the wing 50.

On the flap 2, a first connecting portion 11 connected to the first link member 6 and a second connecting portion 12 connected to the second link member are formed inside the flap 2 (that is, on a lower surface when the flap 2 is extended). The first connecting portion 11 has a joint (articulation) P (second joint), and the second connecting portion 12 has a joint Q (third joint).

On the flap 2, separately from the first connecting portion 11 and the second connecting portion 12, a third connecting portion 13 connected to the third link member 8 is formed inside the flap 2 (that is, on the lower surface side when the flap 2 is extended). The third connecting portion 13 has a joint R (fifth joint).

On the flap 2, the first connecting portion 11 and the second connecting portion 12 are disposed at an interval along a wing chord direction of the wing 50. In addition, the second connecting portion 12 and the third connecting portion 13 are disposed on substantially the same straight line at an interval along the wing spanwise direction of the wing 50.

The first rotary shaft 3 is installed with an axial direction being along the spanwise direction of the wing 50. One first rotary shaft 3 is installed for one wing 50. The first rotary shaft 3 is supported by the wing 50 via, for example, a rib 51. A bearing (not illustrated) is disposed between the rib 51 and the first rotary shaft 3. A plurality of the ribs 51 are connected to a spar (beam) 52 installed along the spanwise direction of the wing 50.

The first rotary shaft 3 rotates around an axis by using a motor (not illustrated) as a drive source. A connecting portion 14 connected to the first link member 6 is formed on an outer periphery of the first rotary shaft 3. The connecting portion 14 is formed integrally with the first rotary shaft 3, and rotates around a rotation axis of the first rotary shaft 3 along with the rotation of the first rotary shaft 3. The connecting portion 14 has a joint A (the first joint). The connecting portions are installed at a plurality of locations along the axial direction of the first rotary shaft 3.

The second rotary shaft 4 is installed with an axis being along the spanwise direction of the wing 50. One second rotary shaft 4 is installed for one wing 50. The second rotary shaft 4 is supported by the wing 50 via, for example, a rib 51. A bearing (not illustrated) is provided between the rib 51 and the second rotary shaft 4.

The second rotary shaft 4 rotates around an axis using a motor (not illustrated) as a drive source. A connecting portion 18 connected to the fourth link member 9 and a connecting portion 19 connected to the fifth link member 10 are formed on the outer periphery of the second rotary shaft 4. Both the connecting portion 18 and the connecting portion 19 are formed integrally with the second rotary shaft 4, and rotate around the rotary shaft of the second rotary shaft 4 within a range of a predetermined angle along with the rotation of the second rotary shaft 4. The connecting portion 18 is provided with a joint C, and the connecting portion 19 is provided with a joint D. The connecting portion 18 and the connecting portion 19 are installed at a plurality of locations along the axial direction of the second rotary shaft 4.

The rotary member 5 is a shaft-shaped member, and is installed in the rib 51 of the wing 50 via a rotation support member 20 as illustrated in FIG. 1, and rotates around the axis within a range of a predetermined angle. The rotation support member 20 is installed in the rib 51. The rotation support member 20 accommodates a bearing (not illustrated) that supports the rotary member 5. The rotary members 5 are disposed one by one for each location where the second link mechanism is installed.

A connecting portion 15 connected to the third link member 8, a connecting portion 16 connected to the fourth link member 9, and a connecting portion 17 connected to the fifth link member 10 are formed on an outer periphery of the rotary member 5. The connecting portion 15, the connecting portion 16, and the connecting portion 17 are all formed integrally with the rotary member 5, and rotate around the rotation axis of the rotary member 5 along with the rotation of the rotary member 5. The connecting portion 15 is provided with a joint B, the connecting portion 16 is provided with a joint E, and the connecting portion 17 is provided with a joint F. An axial length of the rotary member 5 may be any desired length as long as the connecting portion 15, the connecting portion 16, and the connecting portion 17 are formed on an outer peripheral surface of the rotary member 5. The rotary member 5 is shorter than the first rotary shaft 3 and the second rotary shaft 4.

The first link mechanism and the second link mechanism are installed near the rib 51 of the wing 50. In addition, a set of the first link mechanism and the second link mechanism, in which one first link mechanism and one second link mechanism form one set, is disposed at a plurality of locations at an interval along the wing spanwise direction of the wing 50. The set of the first link mechanism and the second link mechanism does not need to be disposed in all of the ribs 51.

The first link mechanism connects the first rotary shaft 3 and the flap 2 to each other. The first link mechanism is composed of the first link member 6, the second link member 7, and the third link member 8. By the first link mechanism being driven by the first rotary shaft 3, the flap 2 moves on a track between when the flap is retracted and when the flap 2 is extended to the maximum.

The second link mechanism connects the second rotary shaft 4 and the flap 2 to each other. The second link mechanism is composed of the rotary member 5, the first link member 6, the second link member 7, the third link member 8, the fourth link member 9, and the fifth link member 10. By the second link mechanism being driven by the second rotary shaft 4, a position and an angle of the flap 2 moved by the second link mechanism are changed.

The first link member 6 is a rod-shaped member. One end is connected to the first connecting portion 11 of the flap 2 via the joint P, and the other end is connected to the connecting portion 14 of the first rotary shaft 3 via the joint A. The second link member 7 is a rod-shaped member. One end is connected to the second connecting portion 12 of the flap 2 via the joint Q, and the other end is connected to the connecting portion 14 of the first rotary shaft 3 via the joint A.

The third link member 8 is a rod-shaped member. One end is connected to the third connecting portion 13 of the flap 2 via the joint R, and the other end is connected to the connecting portion 15 of the rotary member 5 via the joint B (fourth joint).

The fourth link member 9 is a rod-shaped member. One end is connected to the connecting portion 18 of the second rotary shaft 4 via the joint C (sixth joint), and the other end is connected to the connecting portion 16 of the rotary member 5 via the joint E (seventh joint). The fifth link member 10 is a rod-shaped member. One end is connected to the connecting portion 19 of the second rotary shaft 4 via the joint D (eighth joint), and the other end is connected to the connecting portion 17 of the rotary member 5 via the joint F (ninth joint).

The fourth link member 9 and the fifth link member are connected to the second rotary shaft 4 and the rotary member 5 so that both of these are parallel to each other. Any desired configuration can be adopted as long as the rotary member 5 is rotated by the rotation of the second rotary shaft 4. The fourth link member 9 and the fifth link member 10 may not be parallel to each other.

Next, an operation of the high-lift device 1 according to the present embodiment will be described.

Hereinafter, a case where the first rotary shaft 3 and the second rotary shaft 4 are driven at different timings, for example, a case where the second rotary shaft is rotated after the first rotary shaft 3 is rotated will be described. The present invention is not limited to this example, and the second rotary shaft 4 can be simultaneously rotated while the first rotary shaft 3 is rotated.

The flap 2 is extended and retracted by driving the first rotary shaft 3. The flap 2 is moved by the first link mechanism composed of three members such as the first link member 6, the second link member 7, and the third link member 8.

In a case where the flap 2 is changed from a retracted state to an extended state, the first rotary shaft 3 is rotated to move the connecting portion 14 from the trailing edge side to the leading edge 50a side. In this manner, as illustrated in FIGS.

1 to 3, the third link member 8 pivots around the joint B of the connecting portion 15 as a fulcrum while a position of the connecting portion 15 of the rotary member 5 is maintained to be constant. In addition, while the joint A of the connecting portion 14 moves around the axis of the first rotary shaft 3, the first link member 6 and the second link member 7 pivot around the joint A as a fulcrum. As a result, the positions of the joint A of the first rotary shaft 3 and the joints P, Q, and R of the flap 2 are changed, and the flap 2 is changed from the retracted position to the extended position.

The position or the angle of the flap 2 moved by the first link mechanism is changed by driving the second rotary shaft 4. The flap 2 is moved by the second link mechanism composed of the rotary member 5, the first link member 6, the second link member 7, the third link member 8, the fourth link member 9, and the fifth link member 10.

In a case where the position or the angle of the flap 2 moved by the first link mechanism is changed, the second rotary shaft 4 is rotated. In this manner, as illustrated in FIG. 4, the connecting portion 18 and the connecting portion 19 of the second rotary shaft 4 move, and the fourth link member 9 and the fifth link member 10 move. Then, as the fourth link member 9 and the fifth link member 10 move, the connecting portion 16 and the connecting portion 17 of the rotary member 5 move, and the rotary member 5 rotates around the axis. That is, the rotary member 5 rotates in accordance with the movement of the second rotary shaft 4. In addition, by the rotation of the rotary member 5 around the axis, the position of the connecting portion 15 is changed.

In this manner, the third link member 8 connected to the rotary member 5 by the connecting portion 15 pivots. In addition, while the position of the connecting portion of the first rotary shaft 3 is maintained to be constant, the first link member 6 and the second link member 7 pivot around the joint A of the connecting portion 14 as a fulcrum. As a result, while the extended state of the flap 2 is maintained, the position of the joint B of the rotary member 5 and the positions of the joints P, Q, and R of the flap 2 are changed, and the position and the angle of the flap 2 moved by the first link mechanism are changed.

In a case where the flap 2 is changed from the extended state to the retracted state, a rotation direction of the first rotary shaft 3 is changed so that the first rotary shaft 3 is rotated in a direction opposite to the rotation direction in a case where the flap 2 is changed from the retracted state to the extended state. In addition, in a case where the position and the angle of the flap 2 are changed by rotating the second rotary shaft 4 in the extended state, the second rotary shaft 4 is rotated in a direction opposite to the rotation direction of the second rotary shaft 4 when the extended state is changed the flap 2, so that the flap 2 is properly retracted in the lower surface of the leading edge 50a of the wing 50.

As described above, the high-lift device 1 according to the present embodiment is provided with the second rotary shaft 4 for changing the position and the angle of the flap 2 moved by the first link mechanism, in addition to the first rotary shaft 3 for extending or retracting the flap 2. In this manner, at each time of takeoff and landing of the airplane, not only the position and the angle on the track based on the first rotary shaft 3, but also the position and the angle of the flap 2 based on the second rotary shaft 4 can be properly set. As a result, at each time of takeoff and landing, it is possible to set an optimal aerodynamic shape of the wing or an optimal gap dimension of a slot. Therefore, the high-lift device 1 can show high performance at each time of takeoff and landing.

In the above-described embodiment, a case has been described where the flap 2 is adjusted to have the position and the angle which are optimal for each time of takeoff and landing. However, the present invention is not limited to this example. In a case where the flap 2 is used in a flight state other than that at the time of takeoff and landing, the flap 2 may be adjusted to the position and the angle which are optimal for the flight state.

In addition, according to the present invention, the positions of the first rotary shaft 3, the second rotary shaft 4, and the rotary member 5, the lengths of the first link member 6, the second link member 7, the third link member 8, the fourth link member 9, and the fifth link member 10, and positions or the like of connecting points between the respective members are not limited to the illustrated example in the above-described embodiment. Furthermore, according to the present invention, the number or the combination, or as such, of members configuring such as the first link mechanism and the second link mechanism is not limited to the example in the above-described embodiment. The members configuring the first link mechanism and the second link mechanism may have another shape or another disposition relationship as long as the followings are satisfied. By driving the first link mechanism by the rotation force of the first rotary shaft, the flap can be retracted in the lower surface of the leading edge or can be extended forward of the leading edge. By driving the second link mechanism by the rotation force of the second rotary shaft, the position or the angle of the flap moved by the first link mechanism can be changed.

Figure 5:
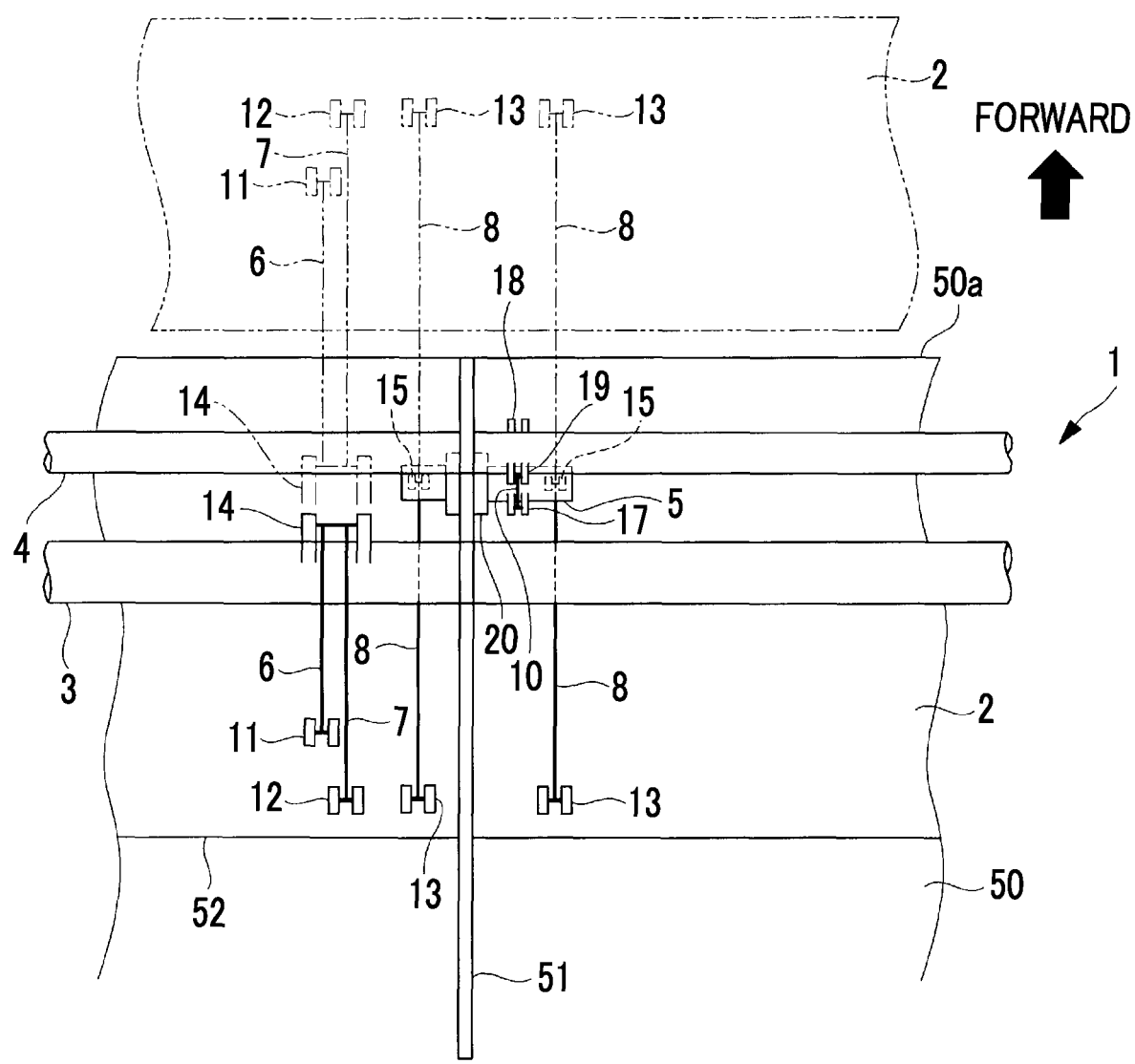
FIG. 5 is a plan view illustrating a modification example of the high-lift device according to the embodiment of the present invention.

In the embodiment illustrated in FIG. 1, a case has been described in which the rotary member 5 is disposed only on one side of the rotation support member 20 and the connecting portion 15 connected to the third link member 8 is formed at one location on the outer periphery of the rotary member 5. However, the present invention is not limited to this example. For example, as in a modification example illustrated in FIG. 5, regarding the rotation support member 20 installed to penetrate the rib 51, the rotary member 5 may be disposed to protrude to both sides of the rib 51, and the connecting portions 15 may be formed at two locations. In this case, the third link member 8 is connected to each of the connecting portions 15, and the third connecting portions 13 at two locations are disposed close to each other on the flap 2. In this manner, the position and the angle of the flap 2 are more stably changed by the second link mechanism.

REFERENCE SIGNS LIST

1: high-lift device
2: flap
3: first rotary shaft
4: second rotary shaft
5: rotary member
6: first link member
7: second link member
8: third link member
9: fourth link member
10: fifth link member
11: first connecting portion
12: second connecting portion
13: third connecting portion
14, 15, 16, 17, 18, 19: connecting portion
20: rotation support member
50: wing 50a: leading edge
51: rib
52: spar
A, B, C, D, E, F, P, Q, R: joint

The invention claimed is:

1. A high-lift device comprising:
a flap installed in a leading edge of a wing, retracted in a lower surface of the leading edge, and extended forward of the leading edge;
a first rotary shaft having an axial direction installed along a spanwise direction of the wing;
a second rotary shaft having an axial direction installed along the spanwise direction of the wing;
a first link mechanism connected to the first rotary shaft and the flap; and
a second link mechanism connected to the second rotary shaft and the flap,
wherein the first link mechanism is driven by a rotation force of the first rotary shaft so that the flap is retracted in the lower surface of the leading edge or is extended forward of the leading edge, and
wherein the first link mechanism and the second link mechanism are driven by a rotation force of the second rotary shaft so that a position or an angle of the flap moved by the first link mechanism is changed.

2. The high-lift device according to claim 1, further comprising:
a rotary member having an axial direction installed along the spanwise direction of the wing;
a first link member having one end connected to the first rotary shaft via a first joint, and the other end connected to the flap via a second joint;
a second link member having one end connected to the first rotary shaft via the first joint, and the other end connected to the flap via a third joint;
a third link member having one end connected to the rotary member via a fourth joint, and the other end connected to the flap via a fifth joint;
a fourth link member having one end connected to the second rotary shaft via a sixth joint, and the other end connected to the rotary member via a seventh joint; and
a fifth link member having one end connected to the second rotary shaft via an eighth joint, and the other end connected to the rotary member via a ninth joint,
wherein the first link mechanism is composed of the first link member, the second link member, and the third link member, and
wherein the second link mechanism is composed of the rotary member, the first link member, the second link member, the third link member, the fourth link member, and the fifth link member.

3. A wing comprising:
the high-lift device according to claim 1.

4. An aircraft comprising:
the high-lift device according to claim 1.

5. A high-lift device comprising:
a flap installed in a leading edge of a wing, retracted in a lower surface of the leading edge, and extended forward of the leading edge;
a first rotary shaft having an axial direction installed along a spanwise direction of the wing;
a second rotary shaft having an axial direction installed along the spanwise direction of the wing;
a first link mechanism connected to the first rotary shaft and the flap; and
a second link mechanism connected to the second rotary shaft and the flap,
wherein the first link mechanism is driven by a rotation force of the first rotary shaft so that the flap is retracted in the lower surface of the leading edge or is extended forward of the leading edge,
wherein the second link mechanism is driven by a rotation force of the second rotary shaft so that a position or an angle of the flap moved by the first link mechanism is changed,
wherein the high-lift device further comprises:
a rotary member having an axial direction installed along the spanwise direction of the wing;
a first link member having one end connected to the first rotary shaft via a first joint, and the other end connected to the flap via a second joint;
a second link member having one end connected to the first rotary shaft via the first joint, and the other end connected to the flap via a third joint;
a third link member having one end connected to the rotary member via a fourth joint, and the other end connected to the flap via a fifth joint;
a fourth link member having one end connected to the second rotary shaft via a sixth joint, and the other end connected to the rotary member via a seventh joint; and
a fifth link member having one end connected to the second rotary shaft via an eighth joint, and the other end connected to the rotary member via a ninth joint,
wherein the first link mechanism is composed of the first link member, the second link member, and the third link member, and
wherein the second link mechanism is composed of the rotary member, the first link member, the second link member, the third link member, the fourth link member, and the fifth link member.

* * * * *